United States Patent Office 3,560,031
Patented Feb. 2, 1971

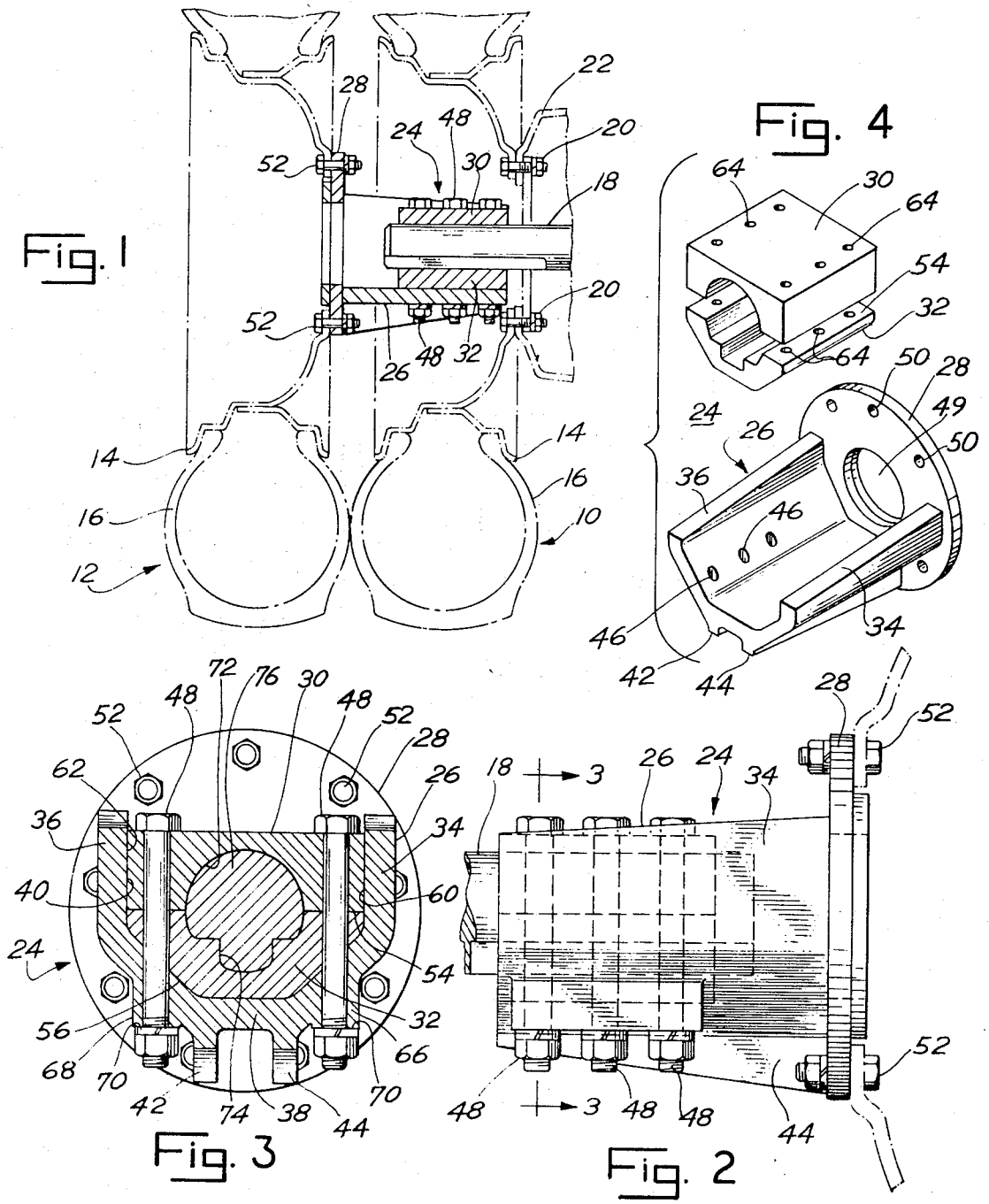

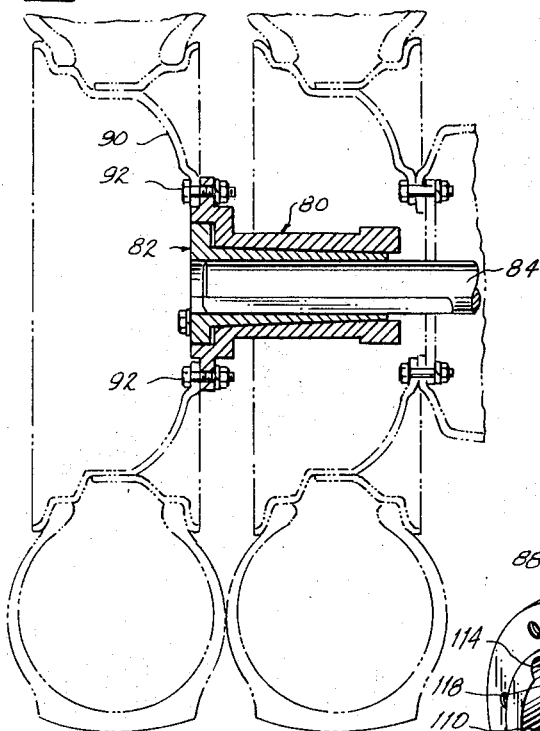
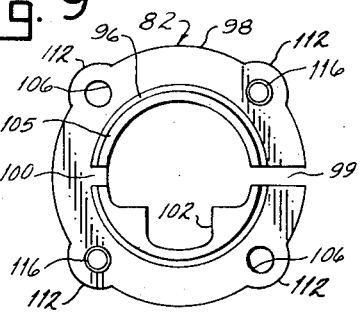
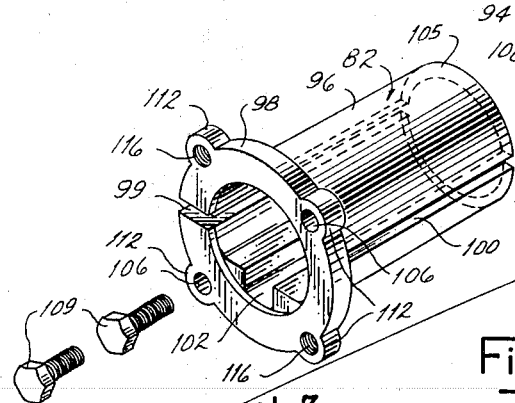
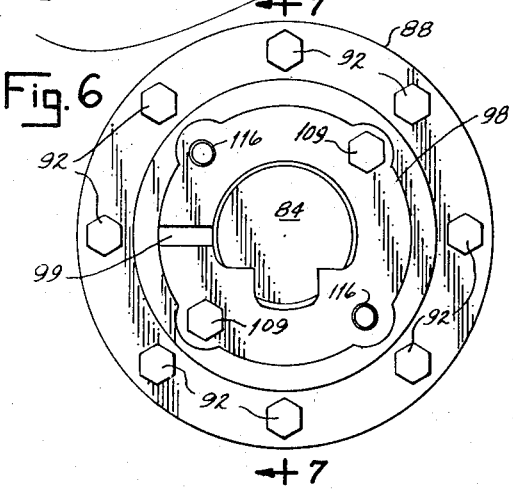
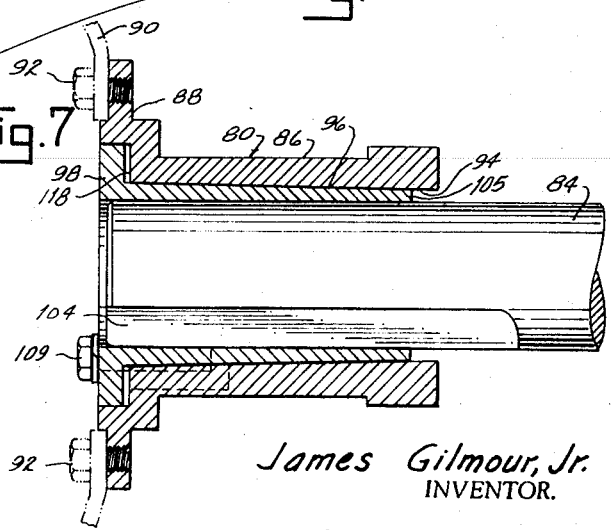

3,560,031
COMPRESSIBLE DUAL AXLE MOUNT
James Gilmour, Jr., Rte. 2, Aurora, Ill.
Continuation-in-part of application Ser. No. 610,606, Jan. 20, 1967. This application Dec. 2, 1968, Ser. No. 780,366
Int. Cl. B60b 27/06
U.S. Cl. 287—52.06                           5 Claims

ABSTRACT OF THE DISCLOSURE

A mount for adding an additional wheel to a tractor comprising a hub with an integral wheel supporting end plate and a removable insert clamped between the tractor's axle and the hub. In a first embodiment, the hub is U-shaped and the inserts are bolted both to the tractor's axle and to the hub. In a second embodiment, the hub is annular and the insert comprises a tapered sleeve that is wedged between the tractor's axle and the hub. In both embodiments the inserts may be interchanged with other inserts allowing the hub to be mounted on axles of different diameters.

---

This is a continuation-in-part of my copending application Ser. No. 610,6°6, filed Jan. 20, 1967, now Pat. No. 3,476,416, for an Axle Mount.

This invention relates, in general, to tractors and, in particular, to axle mounts for tractors for converting the drive wheels thereof, from singles to duals.

Numerous arrangements have been devised for converting a tractor's drive wheels from singles to duals, however, each of them has been generally unsatisfactory, for one reason or another. For example, many of these arrangements are so-called rim mount duals, the rims of the dual wheels being fixedly and drivingly secured to rims of the generally used wheels. Rim mount duals often place a considerable strain on the rims of both of the wheels, and particularly on the rims of the wheels to which the dual is affixed. This strain many times results in a destruction of one or both of the rims, due to warpage, breakage and the like. Many of the other arrangements have included a hub of some type which is adapted to be affixed, on most cases, with U-bolts, to the tractor's axle. These hubs are generally quite unstable and, as a result, they are subject to considerable wear and rendered useless after a relatively short period of use. Others are not versatile and cannot be used to convert to duals on different tractors having different size or shape axles.

Accordingly, it is an object of the present invention to provide improved dual axle mounts which are particularly useful in converting the drive wheels of tractors, from single wheels to dual wheels.

Another object is to provide improved dual axle mounts of the described type which are adaptable to any size and shape axle.

Still another object is to provide improved dual axle mounts of the described type which minimize the manual labor required to install and remove the dual axle mount and/or the dual wheel.

A more particular object is to provide improved dual axle mounts of the described type which include a number of insert blocks which are interchangeable to adapt the dual axle mount to any size and shape axle.

Another object is to provide improved dual axle mounts of the latter described type having straight through alignment bolts which function both to retain the insert blocks and to affix the dual axle mount to an axle so as to provide a more sturdy construction than that of a U-bolt design.

Still another object is to provide improved dual axle mounts of the described type which reduces the strain on the wheels of, for example, a tractor.

A still further object is to provide improved dual axle mounts of the described type which can be left affixed to an axle when the dual wheel is removed.

Another object is to provide an improved dual axle mount in which a hub may be secured to an axle by wedging an annular sleeve insert between an annular hub and axle.

Another object is to provide a dual axle mount with a drive means to insert and wedge the sleeve insert between the hub and the axle.

Another object is to provide a dual axle mount having means to remove the sleeve after it is wedged.

Another object is to provide a dual axle mount which is practical and economically feasible to manufacture.

Other objects of the invention will in part be obvious and will in part appear hereinafter.

The above objectives are accomplished with a dual axle mount which includes in a first embodiment, generally, a hub which is adapted to be affixed to the rim of a wheel and to receive a number of different insert blocks for securing it to any size or shape axle. The insert blocks are retained within the hub and the hub is affixed to an axle, by means of bolts which are extended through the insert blocks and the hub in a straight through alignment. With this construction, a versatile, sturdy dual axle mount is provided.

In a second embodiment, a compressible dual axle mount is shown. In this embodiment, the hub is annular with a tapered interior surface adapted to receive a tapered sleeve insert. The insert is wedged between the hub and the axle to secure the hub to the axle. The sleeve insert has one longitudinal slot running along its entire length and a second longitudinal slot running from its forward end to a rearward sleeve flange so that the sleeve insert may be flexed inwardly as it enters the hub. The sleeve insert is inserted between the hub and axle by tightening a pair of bolts that extend through the flange and that are threaded to the hub. To remove the sleeve, the flange is provided with a pair of threaded openings to receive a pair of bolts which abut against the hub. By screwing the bolts inwardly the bolts bear against the hub and move the sleeve out of engagement with the hub.

The invention accordingly comprises the features of construction, combination of elements, and arrangement of parts which will be exemplified in the construction hereinafter set forth, and the scope of the invention will be indicated in the claims.

For a fuller understanding of the nature and objects of the invention, reference should be had to the following detailed description taken in connection with the accompanying drawing in which:

FIG. 1 is a partial view of a set of dual wheels, sectionalized to illustrate the manner in which the dual axle mount of the present invention is affixed to an axle to convert a single wheel to a dual wheel;

FIG. 2 is a side plan view of the dual axle mount, illustrating the manner in which it is affixed to an axle and further illustrating the manner in which the rim of a wheel is affixed to it;

FIG. 3 is a sectional view taken along lines 3—3 of FIG. 2; and

FIG. 4 is an exploded perspective view of the dual axle mount.

FIG. 5 is a partial view of a set of dual wheels, sectioned to illustrate the manner in which a second embodiment of the dual axle mount of the present invention is affixed to an axle to convert a single wheel to a dual wheel.

FIG. 6 is a front view of the dual axle mount and axle shown in FIG. 5.

FIG. 7 is a sectional view taken along lines 7–7 of FIG. 6.

FIG. 8 is an exploded perspective view of the components of the dual axle mount.

FIG. 9 is a rear view of the sleeve insert shown in FIG. 8.

Similar reference characters refer to similar parts throughout the several views of the drawing.

Referring now to the drawings in FIG. 1 there is illustrated a pair of wheels 10 and 12 each including a rim 14 having a tire 16 mounted on it. The wheel 10 is drivingly affixed to an axle 18, by means of lug bolts 20 extended through apertures (not shown) in the rim 14 and a hub 22. The axle 18 and the hub 22 (both of which are partially shown) may be the axle and hub of a tractor (not shown). The wheel 12 is drivingly affixed to the axle 20, by means of the dual axle mount 24 of the present invention, which is described in detail below. A pair of dual axle mounts 24 permit the single drive wheels normally provided on a tractor to be easily and quickly converted to duals.

More specifically, the dual axle mount 24, as can be best seen in FIGS. 2–2, includes a substantially U-shaped hub 26 having an enlarged circular-shaped end plate 28 affixed to its one end and a pair of insert blocks 30 and 32 which are adapted to be received and fixedly retained within the hub 26. The hub 26 and the end plate 28 are advantageously and preferably casted as an integral unit, however, they could be formed as separate units and fixedly secured together, by welding.

The hub 26 has a pair of arms 34 and 36 which are vertically disposed, in parallel relationship, and have lower ends which angle inwardly towards one another and are joined by a flat base 38, to form a cavity 40 for receiving the insert blocks 30 and 32. A pair of downwardly extending support ribs 42 and 44 are integrally formed with the underside of the flat base 38, to provide additional strength. The upper edges of each of the arms 34 and 36 and the lower edges of each of the support ribs 42 and 44 can be tapered, as illustrated, or simply extended outwardly substantially parallel to one another, as desired. Apertures 46 are extended through the arms 34 and 36 for receiving fastening means, such as the threaded nuts and bolts 48, used to fixedly secure the insert blocks 30 and 32 within the cavity 40.

The end plate 28 has a centrally disposed axle receiving aperture 49 and a number of radially disposed apertures 50 about its peripherial edge which are positioned to align with the apertures normally provided in a wheel rim, such as the rim 14. Lug bolts 52 are extended through the apertures 50 to removably affix a rim to the end plate 28, as illustrated in FIGS. 1 and 2.

The insert block 32, as can be best seen in FIGS. 3 and 4, has a flat top surface 54 and the exterior surface of the side wall 56 thereof is correspondingly shaped to fixedly seat within the lower portion of the cavity 40, as illustrated in FIG. 3. The insert block 30 is substantially rectangular in shape and has a flat bottom surface 58 which is adapted to seat on the flat top surface 54 of the insert block 32 and parallel side walls 60 and 62 which slidably engage the sides of the arms 34 and 36 within the cavity 40, so that the insert block 30 seats within the cavity 40 atop the insert block 32, with a snug fit. The insert blocks 30 and 32 each have a number of apertures 64 therein which are correspondingly aligned with the apertures 46 in the hub 26, for receiving the threaded nuts and bolts 48, to forcibly clamp them together, as illustrated in FIG. 3. A pair of flanges 66 and 68 are integrally formed with the arms 34 and 36 and provide flat nut-bearing surfaces 70 against which the nuts or bolts 48 can bear.

The insert blocks 30 and 32 have recessed cavities 72 and 74 formed therein, respectively, which compliment one another to form an axle cavity 76 which corresponds in size and shape to the axle to which the dual axle mount 24 is to be affixed. In the illustrated embodiment, the axle 18 is substantially circular in shape, having an end portion which is formed to provide a substantially rectangular shaped key 78. The cavity 72 in the insert block 30 is substantially semi-circular in shape and has a radius which corresponds to the radius of the axle 18 so that the axle 18 fits snugly therein. The cavity 74 within the insert block 32 is correspondingly formed to matingly receive the key portion 78 of the axle 18. Accordingly, when the inset blocks 30 and 32 are fixedly clamped about the axle 18 and within the cavity 40 of the hub 26, the axle 18 is fixedly and rigidly retained therein. It has been found that this construction, and particularly the straight through alignment of the nuts and bolts 48, provides a rigid assembly which is much more sturdy and less subject to damage than the dual axle mounts presently available.

In addition to being of a far more sturdy construction, the dual axle mount 24 also is far more versatile in that it can be adapted to any size and shape axle merely by providing insert blocks which have cavities threin which compliment one another to form an axle cavity corresponding to the size and shape of the particular axle to which the dual axle mount is to be affixed to convert to dual wheels. Accordingly, any tractor, or other equipment, can be easily and quickly converted using the same dual axle mount simply by inserting the appropriate insert blocks within the hub 22 thereof.

In converting a single wheel into a dual wheel, appropriate blocks 30 and 32 are loosely retained within the cavity 40 of the hub 26, and the hub 26 is affixed to the axle by sliding the axle through the axle cavity 76 formed by the cavities 72 and 74 within the respective ones of the insert blocks 30 and 32. After the hub 26 is properly positioned on the axle 18, the nuts and bolts 48 are tightened to fixedly clamp the insert blocks 30 and 32 tightly about the axle. Thereafter, the dual wheel, such as the wheel 12, is affixed to the hub 26 or, more particularly, to the end plate 28, thereof, by extending lug bolts 52 through the apertures formed within the end plate 28 and the rim 14 in the same fashion in which a wheel is normally affixed to a hub. It may be noted that the rim 14 of the dual wheel is affixed to a "hub," as opposed to the rim of the other wheel, so that there is no additional strain placed on the rim of either of the two wheels. As indicated above, the straight through alignment of the nuts and bolts 48 provide a far more sturdy construction, particularly when compared to the dual axle mounts of the type which employ U-bolts. Accordingly, the hubs are far more stable and are less subject to wear and/or damage than those employing U-bolts, rim mounts or similar constructions.

From the above description, it can be seen that the dual axle mount 24 and the dual wheel both can be easily and quickly affixed to a tractor's axle, to convert the drive wheels thereof to duals. Furthermore, the dual wheel can be quickly removed, in the same fashion as a wheel is generally removed, and the dual axle mount 24 can be left affixed to the axle, if desired. The same dual axle mount also can be easily and quickly adapted to fit virtually any size and shape axle, merely by providing the appropriate insert blocks.

It is also apparent in reviewing the above description that the insert block 32 can be eliminated and the lower portion of the cavity 40 correspondingly formed so that, in essence, the insert block 32 is an integral part of the hub 26. Only the insert block 30 would therefore be required. This arrangement is not as satisfactory since the dual axle mount would not be as versatile inasmuch as it could not be readily affixed to any size and shape axle. The remaining features, however, would still be available.

A second embodiment of the invention is shown in FIGS. 5 through 9. In this embodiment, instead of having separate insert blocks that are bolted to a U-shaped hub, a sleeve insert is wedged between the axle and an annular hub to secure the hub to the axle.

The second embodiment of the dual axle mount essentially comprises an annular hub 80 and a tapered sleeve or insert 82 adapted to be wedged between hub 80 and axle 84 as best seen in FIGS. 5 and 8.

Hub 80 consists of an elongated annular body 86 with a hub flange 88 cast integrally with its forward end to receive a rim of a wheel 90. Rim 90 is secured to hub flange 88 by an attaching means comprising bolts 92 which extend through bolt receiving apertures spaced about the peripheral face of the flange. The interior surface 94 of the hub is tapered to receive the tapered sleeve 82.

Sleeve or insert 82 comprises an annular body 96 cast on its forward end with a sleeve flange 98. To allow the sleeve to flex inwardly as it is wedged between axle 84 and hub 80, a first longitudinal slot 99 extends the length of the sleeve and a second diametrically opposed, longitudinal slot 100 extends from the rearward end of the sleeve to flange 98. The interior of the sleeve is shaped to conform to the axle when the sleeve is flexed or constricted. The bottom surface of the sleeve defines a channel 102 adapted to mate with projection 104 of the axle. The exterior surface of the body portion 96 of the sleeve insert is tapered. This taper is formed with a larger diameter adjacent sleeve flange end 98 diminishing to a smaller diameter at its forward end 105. This taper causes the flexible sleeve to be flexed inwardly and wedged between the axle and the hub when it is inserted between them.

To constrict the flexible body 96 of sleeve insert 82, the interior surface of the annular hub is tapered to conform with the taper of sleeve 82 but with smaller relative diameter.

To insert and drive the sleeve insert between the hub and axle, sleeve flange 98 contains a pair of diametrically opposed bolt receiving sleeve apertures 106 adapted to align with threaded hub bore 108 in the hub. The sleeve insert is inserted by extending bolts 109 through sleeve apertures 106 and screwing the bolts into the hub bores. As the bolts advance into the hub, they force the sleeve inwardly.

A sleeve flange well 110 is concentrically recessed on the forward face of the hub to receive sleeve flange 98. To assist in preventing the sleeve from rotating relative to the axle and/or hub when the hub is locked to the axle four sleeve locking projections 112 are located on the sleeve flange and are mated with four respective recesses 114 on the periphery of flange well 110 when the insert is wedged.

To remove the sleeve insert, a pair of diametrically opposed, threaded openings 116 on sleeve flange 98 receive bolts 109 which extend through the openings and bear against base 118 of flange well 110. The sleeve is removed by screwing the bolts inwardly.

In installing the dual axle mount, as best seen in FIGS. 5 and 8, hub 80 is first inserted over axle 84. Sleeve insert 82 is then inserted into and wedged between the hub and axle by extending bolts 109 through sleeve apertures 106 and screwing the bolts into hub bores 108. As the bolts are screwed into the hub bores, the sleeve insert is driven forwardly. As it is driven inwardly, it is flexed inwardly and wedged between the axle and hub 80. The taper of the sleeve and hub is arranged such that maximum wedging force will occur when sleeve flange 98 is within flange well 110 in the hub but before the sleeve flange bottoms against the well base 118. As space is provided between flange 98 and well base 118 to insure adjustability.

After the axle mount is installed on the axle, the wheel rim may then be bolted to the hub by bolts 92 through the threaded bolt apertures on hub flange 88.

To remove the sleeve insert, bolts 109 are disengaged with hub bores and screwed into threaded bolt openings 116 on sleeve flange 90. The bolts are screwed inwardly until they extend through both openings 116 and bear against the well base 118. As the bolts are advanced further, they drive the sleeve outwardly and out of engagement with the hub and axle.

As in the previous embodiment, sleeves of different diameters may be interchanged with the hub such that the hub 80 may be mounted on axles of different diameters.

The second embodiment or the compressible dual axle mount, as now should be evident, has unique features which enable an additional wheel to be installed on an axle rapidly and securely. The embodiment conveniently secures the wheel to the axle without the necessity of extending a bolt through the axle, which would weaken it, or by the necessity of fabricating the hub in two halves and then clamping it to the axle with bolts. The composite of the annular hub and sleeve make the mount exceptionally sturdy and durable. Being the embodiment is simple and comprised of few basic components, it can be advantageously economically manufactured.

It will thus be seen that the objects set forth above, among those made apparent from the preceding description, are efficiently attained and, since certain changes may be made in the above construction without departing from the scope of the invention, it is intended that all matter contained in the above description or shown in the accompanying drawing shall be interpreted as illustrative and not in a limiting sense.

It is also to be understood that the following claims are intended to cover all of the generic and specific features of the invention herein described, and all statements of the scope of the invention, which, as a matter of language, might be said to fall therebetween.

Now that the invention has been described:

What is claimed is:

1. A dual axle mount for mounting an additional wheel onto an axle comprising: an annular hub sleeve adapted to receive said axle, attaching means on said hub for attaching said hub to a rim of a wheel, an annular sleeve insert, which comprises wedge means and is adapted to be inserted between said hub and said axle, said sleeve insert being tapered to a smaller outside diameter at its forward end, said sleeve insert also having a first longitudinal slot co-extensive with said insert, a sleeve flange conjoined with the rear of said sleeve and extending radially therefrom, a second longitudinal slot co-extensive with said sleeve and said flange, said hub having an inner tapered surface of slightly larger taper angle than said sleeve insert whereby upon insertion of said insert said sleeve will be biased inward and wedged between said axle and said hub, said hub further having a radially extending conjoined flange on the front of said annular sleeve, said flange having a concentric flange well in the face of said flange, said well adapted to receive said sleeve flange when said sleeve insert is advanced into said hub, said sleeve flange having at least one projection on its periphery, said flange well having a flange well wall, said wall having a recess therein for receiving said projection, thus preventing said sleeve insert from rotating relative to said hub.

2. The dual axle mount of claim 1 further including sleeve insert drive means for inserting said sleeve between said hub and said axle.

3. The dual axle mount of claim 1 wherein said sleeve insert drive means comprises bolt receiving apertures in said sleeve flange, said hub having threaded bores aligned with said apertures, bolts extending through said apertures and screwed into said bores whereby when said bolts are screwed inwardly, said sleeve insert is driven forwardly between said hub and said axle.

4. The dual axle mount of claim 3 further including sleeve insert removable means for removing said sleeve insert from between said hub and said axle.

5. The dual axle mount of claim 4 wherein said sleeve insert removable means comprises threaded bolt receiving openings in said sleeve flange, said threaded bolt receiving openings aligned with the base wall of said sleeve well, bolts being screwed into said threaded openings, the forward end of said bolts adapted to bear against the base of said sleeve well whereby as said bolts are screwed inwardly said sleeve insert is removed from between said hub and said axle.

References Cited

UNITED STATES PATENTS

| | | | |
|---|---|---|---|
| 1,392,915 | 10/1921 | Clendenon | 287—52 |
| 1,395,913 | 11/1921 | Ford | 287—52.06X |
| 1,422,598 | 7/1922 | Misenheimer | 287—52X |
| 2,407,032 | 9/1946 | Myers | 287—52.06 |
| 2,524,027 | 10/1950 | Blackmarr | 287—52.06 |
| 3,302,959 | 2/1967 | Smelcer | 287—52.06 |
| 3,445,130 | 5/1969 | Obenshain | 287—52.03 |

DAVID J. WILLIAMOWSKI, Primary Examiner

A. V. KUNDRAT, Assistant Examiner.

U.S. Cl. X.R.

301—1